United States Patent [19]
Sargisson

[11] 3,879,941
[45] Apr. 29, 1975

[54] VARIABLE CYCLE GAS TURBINE ENGINE

[75] Inventor: Donald Farley Sargisson, Cincinnati, Ohio

[73] Assignee: General Electric Company, Lynn, Mass.

[22] Filed: May 21, 1973

[21] Appl. No.: 362,380

[52] U.S. Cl................. 60/226 R; 60/263; 137/15.1
[51] Int. Cl............................................. F02k 3/02
[58] Field of Search............... 60/226 R, 39.29, 262; 415/145, 151, 79; 137/15.1, 15.2; 181/33 HC

[56] References Cited
UNITED STATES PATENTS

| | | | |
|---|---|---|---|
| 3,316,717 | 5/1967 | Castle et al. | 60/226 R |
| 3,430,640 | 3/1969 | Lennard | 137/15.1 |
| 3,514,952 | 6/1970 | Schumacher et al. | 181/33 HC |
| 3,515,033 | 6/1970 | Geyer | 60/97 E |
| 3,578,106 | 5/1971 | Ellis | 181/33 HC |
| 3,637,041 | 1/1972 | Hilbig | 181/33 HC |
| 3,792,584 | 2/1974 | Klees | 60/226 R |

FOREIGN PATENTS OR APPLICATIONS

| | | | |
|---|---|---|---|
| 948,390 | 2/1964 | United Kingdom | 60/262 |

*Primary Examiner*—C. J. Husar
*Assistant Examiner*—O. T. Sessions
*Attorney, Agent, or Firm*—Derek P. Lawrence; James W. Johnson, Jr.

[57] ABSTRACT

A variable cycle gas turbine engine for commercial supersonic aircraft is provided with variable geometry means to simultaneously control the bypass and pressure ratios for different engine flight conditions wherein the engine may be operated at supersonic speed with a lower bypass and higher pressure ratio than at subsonic speed. The relatively high noise levels generally associated with the supersonic mode of operation for conventional supersonic engines can be significantly reduced by controlling the variable geometry means in a manner which increases the bypass ratio and decreases the pressure ratio of the fan section of the engine. In this manner, supersonic aircraft may approach and take off from airports situated adjacent densely populated areas without unduly disturbing the local residents.

21 Claims, 17 Drawing Figures

VARIABLE CYCLE GAS TURBINE ENGINE

BACKGROUND OF THE INVENTION

The invention relates to a variable cycle gas turbine engine and, more particularly, to a variable cycle gas turbine engine suitable for powering a commercial supersonic aircraft wherein the engine bypass ratio and pressure ratio may be controlled to satisfy particular engine operating conditions.

The advent of commercial supersonic aircraft has imposed challenging requirements on engine manufacturers to develop a suitable supersonic gas turbine engine which will operate efficiently under a broad range of conditions without unduly disturbing the environment. In the past, it has been proposed to utilize straight turbojet engines with afterburning which operate efficiently at high altitude and supersonic cruise. However, straight turbojet engines have not proved entirely satisfactory due primarily to their high jet velocities which generate high noise levels. The problem of aircraft engine noise and its disturbing effect upon people residing in the vicinity of airports has become so acute as of late that the Federal Aviation Agency has established noise level standards which will have to be met by aircraft and gas turbine engine manufacturers before an aircraft powered by a gas turbine engine can be certified.

The new family of high bypass, large diameter, turbofan engines recently introduced into airline service has demonstrated noise levels which are significantly lower than those of previous generation engines even though actual total thrust levels have been increased. The low noise levels of high bypass turbofan engines is attributable to the reduced jet velocities of the airflow pressurized by the fan while the increased thrust is a direct result of the increased mass airflow through the fan. Unfortunately, high bypass turbofan engines, because of their large diameter and high mass flow, are not suitable for supersonic flight and therefore have been limited primarily to the new generation of widebodied subsonic commercial aircraft.

Therefore, it is a primary object of this invention to provide a variable cycle gas turbine engine suitable for powering a commercial supersonic aircraft efficiently without generating excessive noise in the subsonic mode of operation.

It is also an object of this invention to provide a variable cycle gas turbine engine having one mode of operation suitable for supersonic flight wherein the engine has a lower bypass and higher pressure ratio to operate in the manner of an augmented turbofan engine, and another mode of operation suitable for subsonic flight wherein the engine has a higher bypass and lower pressure ratio to operate in a manner resembling a high bypass turbofan, with the use of augmentation being optional.

SUMMARY OF THE INVENTION

A variable cycle gas turbine engine is provided with a fan having a forward section axially spaced apart from an aft section. A variable flow bypassing valve is disposed intermediate the foward and aft fan sections in order that the airflow between the forward and aft fan sections may be connected either in serial flow relation or in bypassing parallel relation depending upon the desired mode of engine operation. The variable cycle engine also includes a variable flow geometry inlet duct in direct flow connection to the fan for furnishing an inlet airflow to the fan. Within the variable cycle engine is a core engine having a compressor, combustor and turbine in serial flow relation wherein the compressor receives a portion of the compressed airflow from the fan. A fan turbine section downstream of the core engine is also provided to drive the fan.

BRIEF DESCRIPTION OF THE DRAWINGS

The invention may be better understood upon reading the following description of the preferred embodiment in conjunction with the accompanying drawings.

DESCRIPTION OF THE PREFERRED EMBODIMENT

Referring to FIGS. 1 and 1A through 1G, there is shown a variable cycle gas turbine engine 10 having an outer casing or nacelle 11 spaced apart from an inner core engine 14 so as to define an annular bypass duct 13 therebetween. The variable cycle engine 10 includes a fan 12 which receives an inlet airflow from a variable geometry inlet, shown generally at 15, and thereupon pressurizes the airflow, a portion of which is delivered to the core engine 14. Aft of the core engine 14, there is a fan turbine 16 which interconnects to the fan by means of a shaft 18. The core engine includes an axial flow compressor 20 having a rotor 22. Pressurized air entering the compressor 20 through a flow annulus 24 is compressed and then discharged to a combustor 26 where fuel is burned to provide high energy combustion gases which drive a turbine 28. The turbine 28, in turn, drives rotor 22 through shaft 30 in the usual manner of a gas turbine engine. The gases of combustion then pass to and drive the fan turbine 16 which, in turn, drives the fan 12. A propulsive force is thus attained by the action of fan 12 discharging air through a variable area fan nozzle 32 having a convergent primary nozzle 34 and a divergent secondary nozzle 36. Propulsive force is also obtained by the discharge of combustion gases from the core engine 14 through a core engine nozzle 38 defined in part by a variable plug 40.

Figure 1:
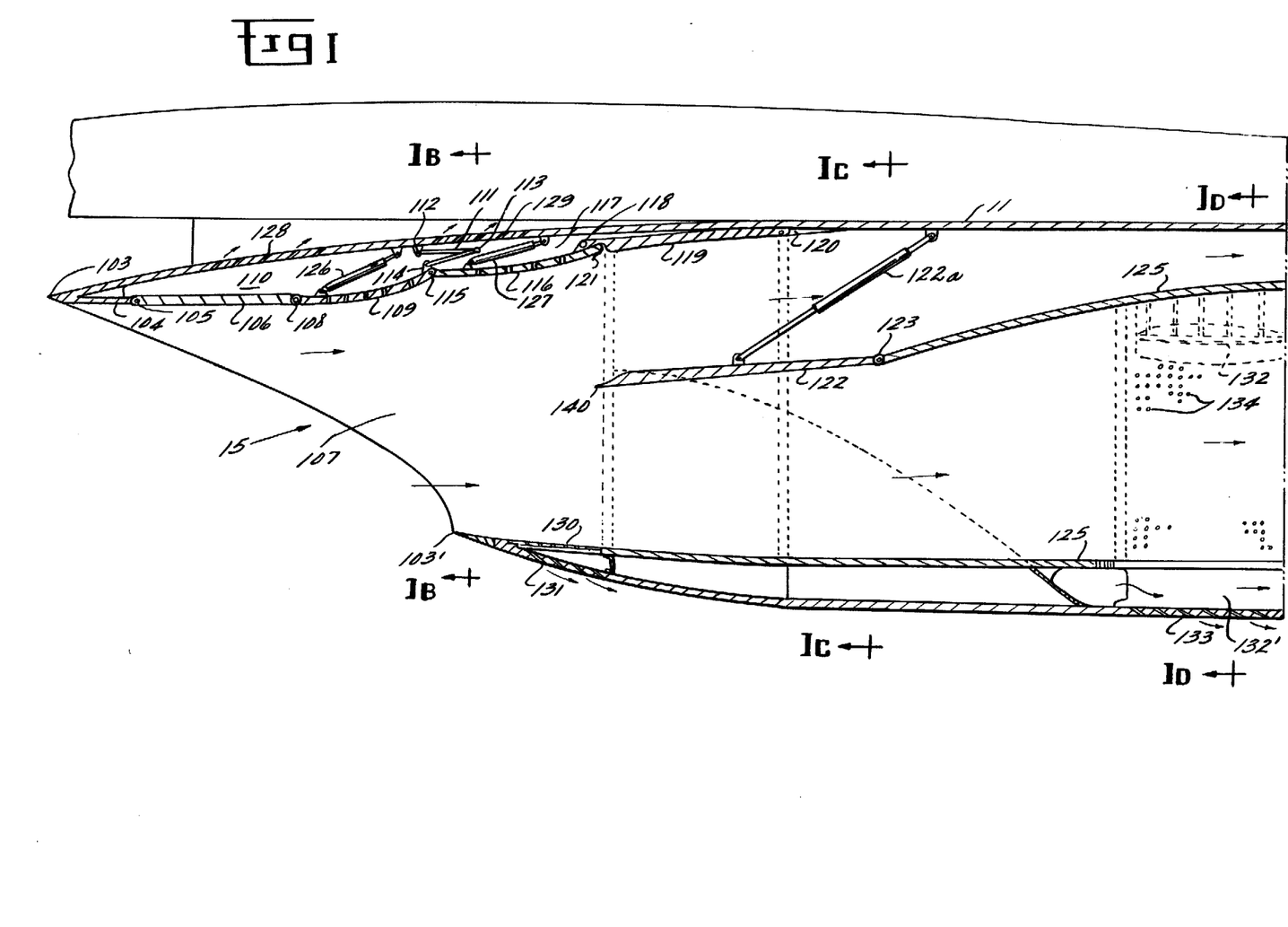
FIG. 1 is a cross-sectional view of a variable inlet for the variable cycle gas turbine engine of this invention.
Figure 1A:
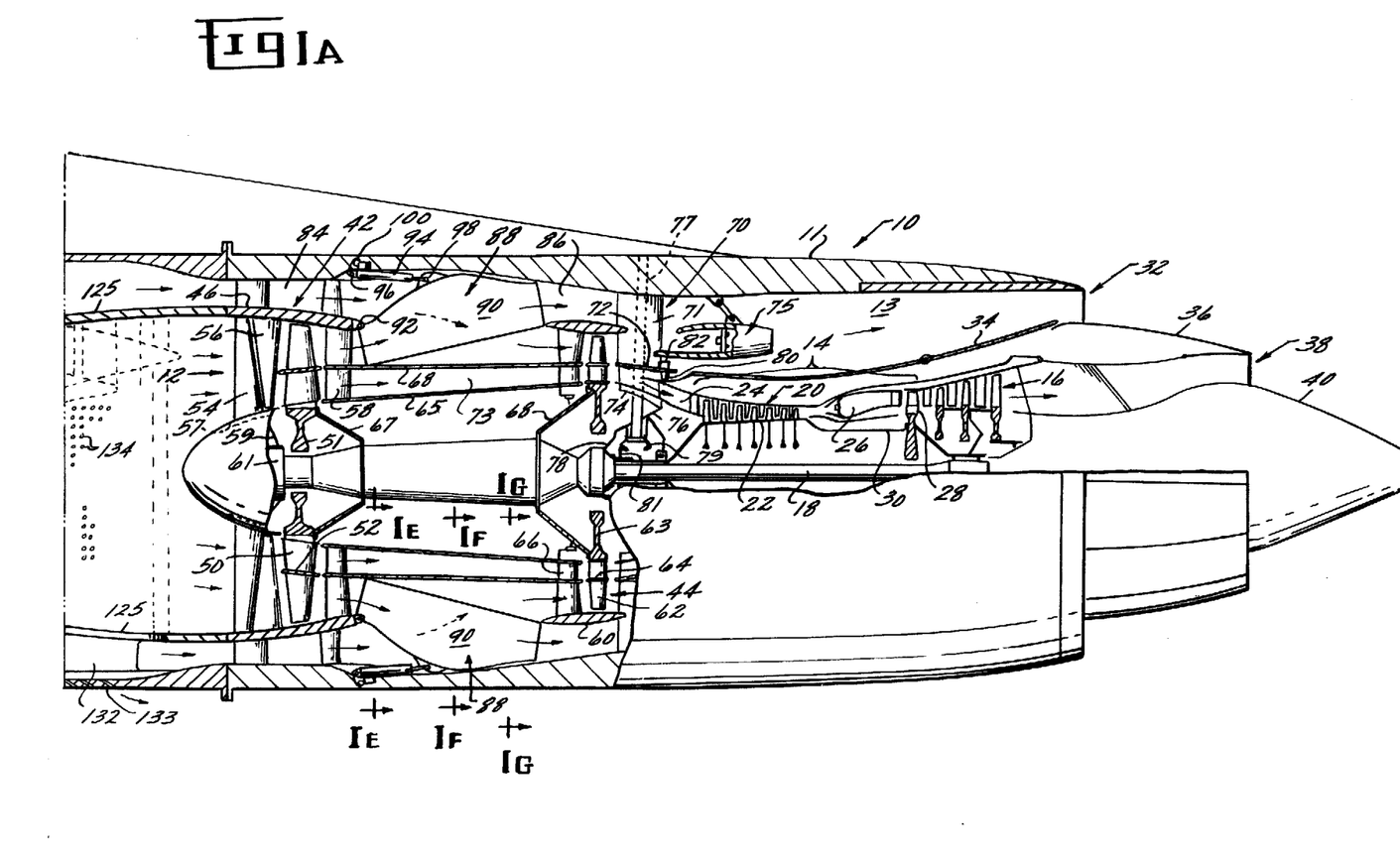
FIG. 1A is a cross-sectional view of the variable cycle gas turbine engine of this invention.

The fan 12 includes a forward section 42 defined within a cylindrical shroud 46 in axially spaced relation to an aft fan section 44 defined within a second cylindrical shroud 60. The forward fan section 42 includes a plurality of circumferentially spaced apart rotor blade 50 peripherally disposed about a forward fan rotor 51. Each forward rotor blade 50 includes a part span platform 52 extending beyond the full cord of the blade, in abutting relation with the part span platforms of adjacent blade. The forward fan section 42 further includes a plurality of circumferentially spaced apart fixed inlet guide vanes 54 extending radially outward from an inner circumferential support ring 57 to the outer cylindrical shroud 46. Each inlet guide vane 54 may include a variable angle trailing edge flap 56. The inner circumferential support ring 57 includes an inwardly extending conical extension 59 for supporting a forward fan shaft bearing 61. A plurality of circumferentially spaced apart fixed outlet guide vanes 58 extend radially outward from an inner engine fairing 65 to the outer circumferential shroud 46.

The aft fan section 44 also includes a plurality of circumferentially spaced apart blade 62 peripherally disposed about an aft fan rotor 63. Fan rotors 51 and 63 are connected for rotation with the shaft 18 by means of conical support members 67 and 68 respectively. The aft rotor blade 62 each also include a part span platform 64 extending the full cord of the blade in abutting relation with the part span platforms of adjacent blade. The aft fan section 44 also includes a plurality of circumferentially spaced apart fixed inlet guide vanes 66 which extend radially outward from the inner fairing 65 to the outer shroud 60. An engine midframe is provided at 70 by a plurality of circumferentially spaced apart vanes 71 which extend radially outward from an inner ring frame 74 to deswirl the pressurized airflow emanating from the fan 12. The inner ring frame 74 includes an inward conical extension 76 which supports a main thrust bearing 78. A bevel gear 81, attached for rotation with the shaft 18, is disposed within the bearing 78 and engages a mating bevel gear 79 from which extends a radial shaft 77. The shaft 77 extends through one of the midframe vanes 71, and may be utilized to drive accessory components in a manner well known to the gas turbine art.

Interconnecting the fixed outlet guide vanes 58 and the fixed inlet guide vanes 66, there is provided an axially extending part span circumferential platform 68 in general coaxial alignment with the blade platforms 52 and 64, and in spaced apart relation to the inner fairing 65 to define an inner core flow annulus 73. The midframe 70 is also intersected by a part span circumferential platform 72 in general coaxial alignment with the part span platforms 52, 64, and the axially extending part span platform 68. A plurality of generally radially extending circumferentially spaced apart bypass passages 80 are provided in flow communication between the compressor flow annulus 24 and the annular bypass duct 13. The bypass passages 80 include bypass valve mechanisms 82 which operate in a manner described in U.S. Pat. No. 3,638,428 assigned to the instant assignee. It should also be appreciated that the bypass duct 13 may include a fan burner as shown generally at 75 wherein the burner receives and burns fuel for thrust augmentation.

Between the forward fan section outer shroud 46 and nacelle 11, there is defined a forward outer plenum 84 with an aft outer plenum 86 correspondingly defined between the aft fan section outer shroud 60 and nacelle 11. Intermediate the forward fan section 42 and aft fan section 44, there is provided a variable flow bypassing valve shown generally at 88. The bypassing valve 88 includes a plurality of axially extending and cricumferentially spaced apart ducts 90, each of which is hinged at 92 to the forward fan section outer shroud 46. A plurality of circumferentially spaced apart actuators 94 are provided into pivotal connection to the nacelle 11 by the spaced apart clevises 96 with the opposing end of each actuator rotatably connected to an adjacent duct by a clevis 98. The actuators 94 may all be synchronously operated by a flexible drive shaft 100 extending circumferentially around the nacelle 11 in interconnection with all the actuators, and of the type fully described in U.S. Pat. No. 3,515,033 assigned to the instant assignee.

Referring now specifically to FIGS. 1A, 1E, 1F and 1G, it can be seen that the cross-sectional shape of the ducts 90 vary considerably along their axial length, although it is preferred that the ducts maintain a near constant cross-sectional area. The spaced apart ducts 90 may assume a near teardrop cross-sectional configuration throughout most of their axial length in order to diffuse the airflow passing in spaces 91 therebetween.

Referring now specifically to FIGS. 1, 1B, 1C and 1D, the nacelle 11 extends forward around the variable geometry inlet duct 15 terminating in a sharp upper leading edge 103 and a sharp lower leading edge 103' preferably located some axial distance aft of the upper leading edge depending upon the maximum design Mach number of the aircraft. Immediately aft of the upper leading edge 103 is a fixed ramp 104 which extends rearwardly and defines the upper inside surface of the inlet duct 15. Immediately aft of the ramp 104 and attached thereto by sealed hinges 105 is a movable panel 106 whose angular position may be varied while the side edges thereof remain in sealed relation relative to an inside wall 107 of the inlet duct 15. Immediately aft of the movable panel 106 and attached thereto by sealed hinges 108 is a perforated movable panel 109 wherein the perforations may be circular holes or slots, the purpose of which is to remove the boundary layer airflow from the inside surface of the panel to a plenum 110. Plenum 110 is defined by the nacelle 11, ramp 104, movable panel 106, perforated movable panel 109 and a two-piece collapsible seal 111 which extends the full transverse width of the inlet duct 15 with the opposing sides thereof in sealing engagement to the inner wall 107 of the inlet duct. Seal 111 is hinged at 112 to the inside surface of nacelle 11 with a center hinge 113 interconnecting the two seal pieces and a fixed hinge attachment 114 connecting the seal 111 to the aft edge of movable panel 109.

Immediately aft of the movable panel 109 and hinged thereto by sealed hinges 115 is a second perforated movable panel 116 whose angular position may also be varied while the side edges thereof remain in sealed relation relative to the inside wall 107 of the inlet duct 15. Panel 116 is perforated in a manner similar to panel 109 in order to remove the boundary layer airflow from the inside surface thereof to a second plenum 117 defined by the nacelle 11, the two-piece collapsible seal 111, the movable panel 116 and a movable single piece sealing panel 119. Sealing panel 119 is connected to the aft edge of panel 116 by a sealed hinge 118 with the upper edge thereof translatably engaged to the nacelle 11 by means of a fixed track section 120 which allows the upper edge to move rearwardly upon upward motion of the panel 119. Sealing panel 119 also extends the full transverse width of the inlet duct 15 with the opposing sides thereof in sealing engagement to the inner wall 107 of the inlet duct.

Air which is bled through the perforated surface of panel 109 and collected in plenum 110 is subsequently discharged outward of the nacelle 11 through louvers 128 which may be either of the fixed type or the variable type controlled as a function of mass flow and static pressure. In like manner, air which is bled through the perforated surface of panel 116 and collected in plenum 117 is subsequently discharged outward of the nacelle 11 through louvers 129 which may also be of the fixed or variable type.

The aft edge of panel 116 includes a flexible seal 121 which, during certain modes of flight operation, overlaps the forward edge 140 of a movable panel 122 in a manner to be made obvious from the following discussion. The aft edge of panel 122 is sealingly hinged at 123 to the forward edge of a circumferential inlet diffuser wall 125 which extends rearwardly into integral connection with the forward fan section outer shroud 46. Actuators 126, 127 are provided to move panels 106, 109 and 116, together with sealing panels 111 and 119 in a manner to be made obvious from the following discussion. Actuator 122A is also provided to move panel 122 in a manner to be made obvious from the following discussion.

Figures 1B, 1C, 1D, 1E, 1F, 1G:
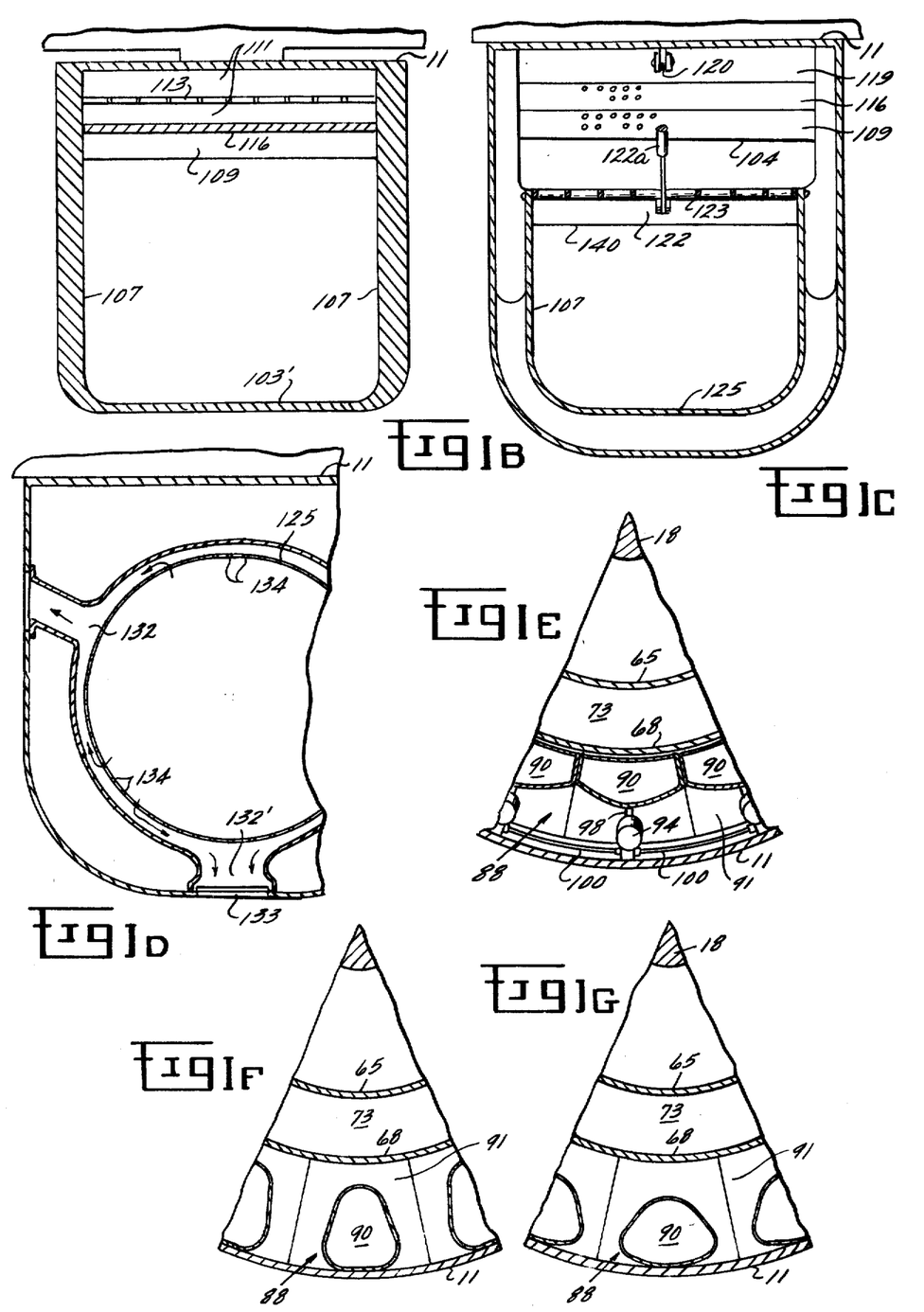
FIG. 1B is a cross-sectional view taken along the line B—B of FIG. 1.
FIG. 1C is a cross-sectional view taken along the line C—C of FIG. 1.
FIG. 1D is a cross-sectional view taken along the line D—D of FIG. 1.
FIG. 1E is a cross-sectional view taken along the line E—E of FIG. 1A.
FIG. 1F is a cross-sectional view taken along the line F—F of FIG. 1A.
FIG. 1G is a cross-sectional view taken along the line G—G of FIG. 1A.
Figure 2:
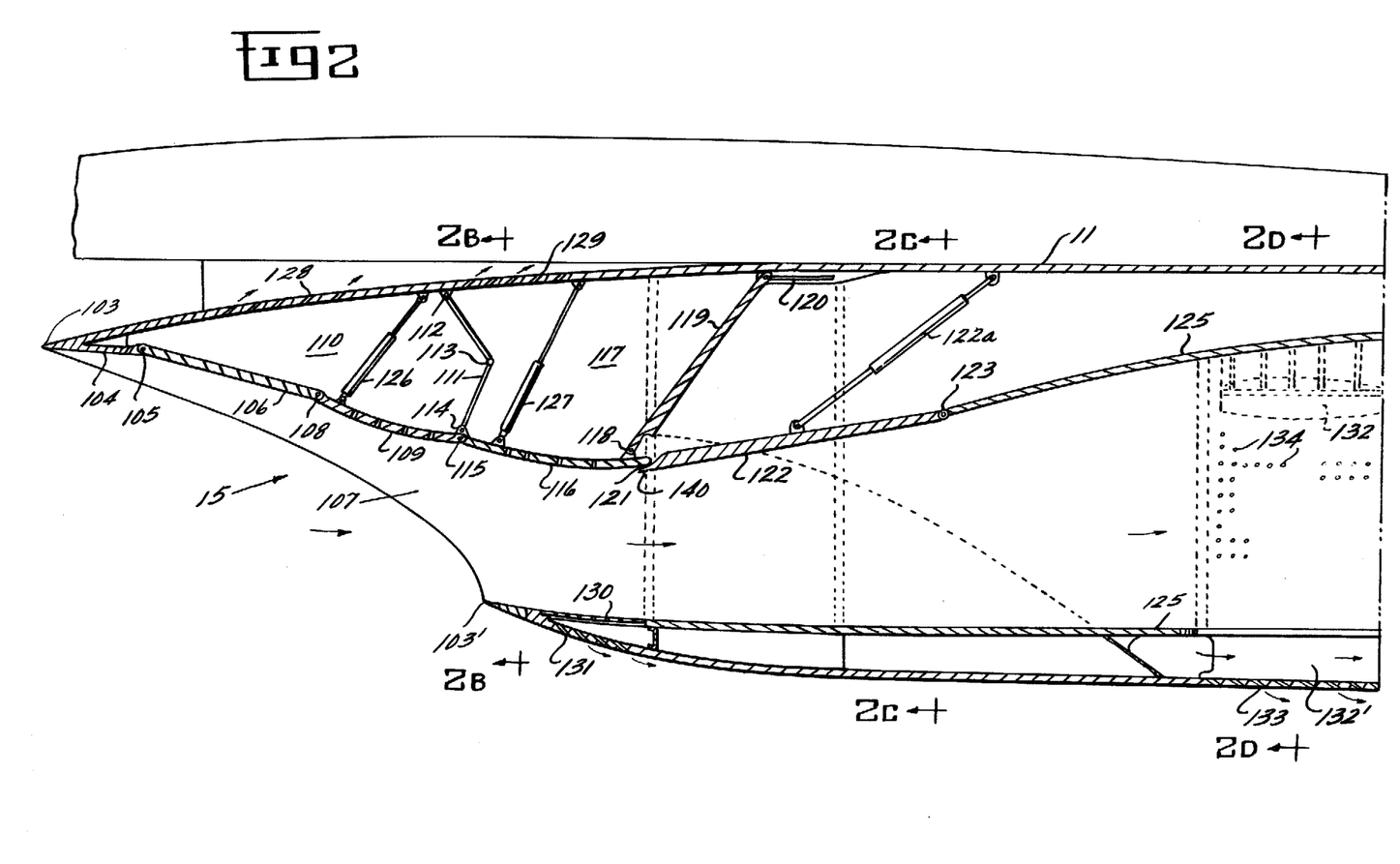
FIG. 2 is a cross-sectional view of the variable inlet of FIG. 1 in a different mode of operation.
Figure 2A:
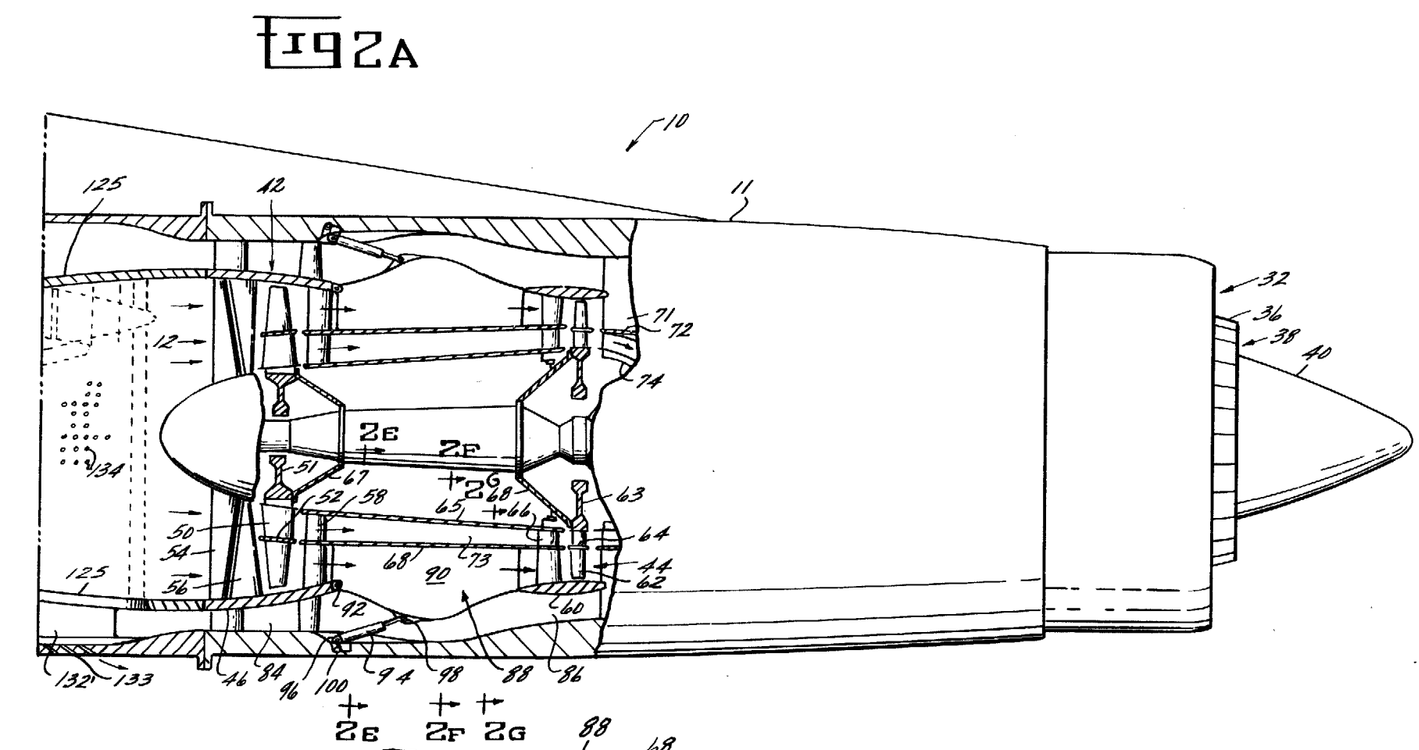
FIG. 2A is a cross-sectional view of the variable gas turbine engine of FIG. 1B in a different mode of operation.
Figures 2B, 2D:
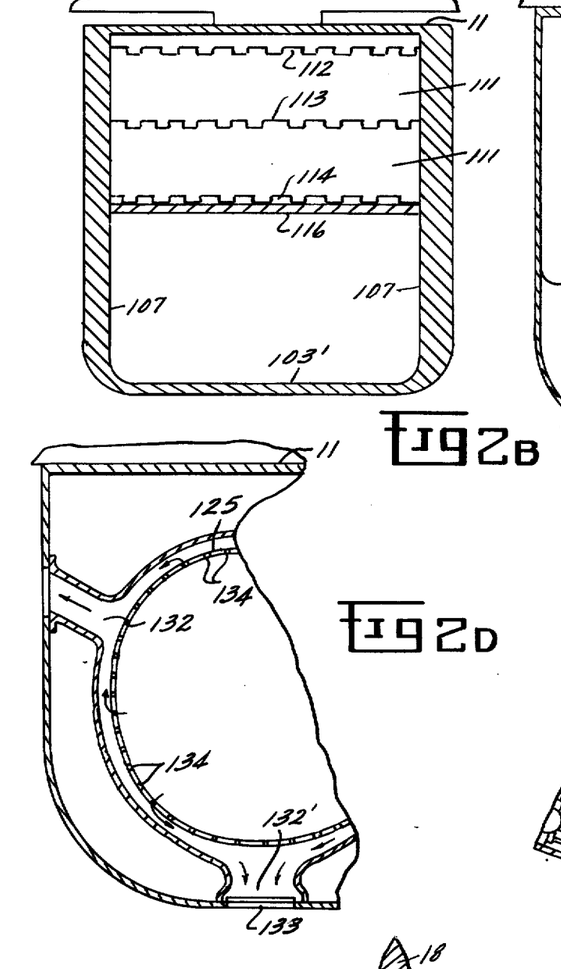
FIG. 2B is a cross-sectional view taken along the line B—B of FIG. 2.
FIG. 2D is a cross-sectional view taken along the line D—D of FIG. 2.
Figure 2C:
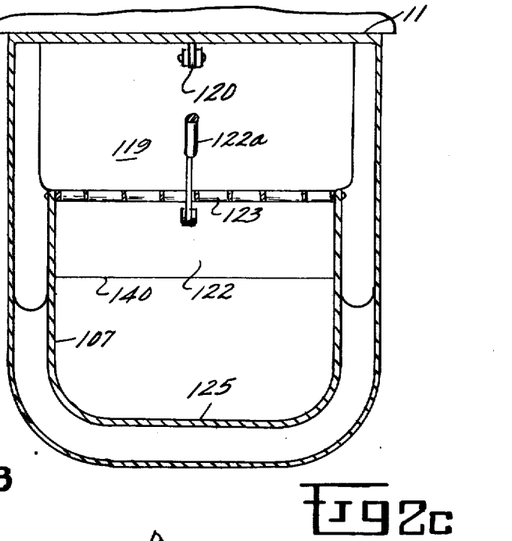
FIG. 2C is a cross-sectional view taken along the line C—C of FIG. 2.
Figure 2E:
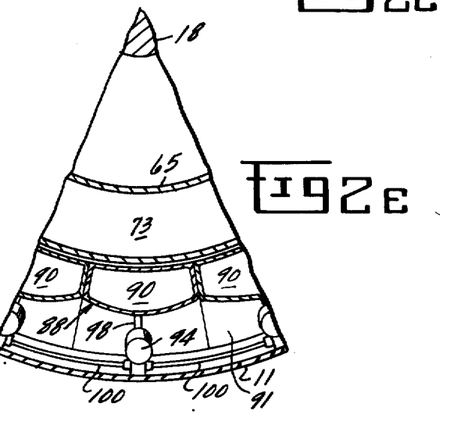
FIG. 2E is a cross-sectional view taken along the line E—E of FIG. 2A.
Figures 2F, 2G:
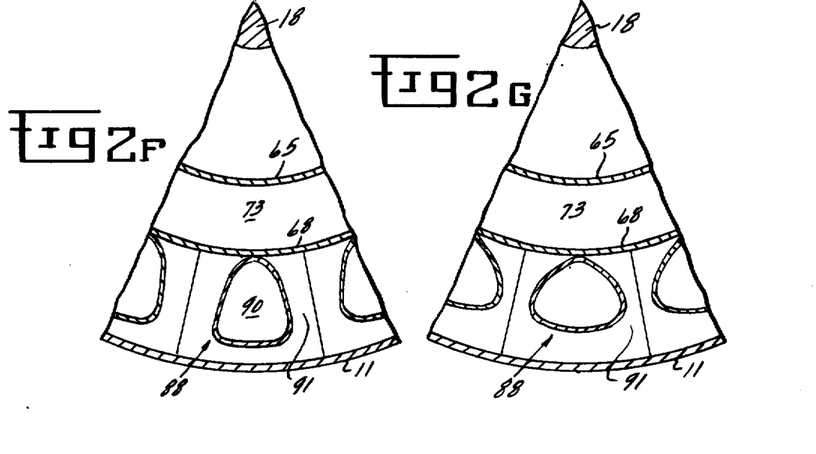
FIG. 2F is a cross-sectional view taken along the line F—F of FIG. 2A.
FIG. 2G is a cross-sectional view taken along the line G—G of FIG. 2A.

The diffuser wall 125 is also provided with perforations 134 consisting of circular holes or slots extending circumferentially around a portion of its axial length. The boundary layer airflow which is bled through the perforations 134 is collected by an annular duct 132 as best shown in FIGS. 1 and 1D, whereupon the bleed air is subsequently discharged from the nacelle 11 through circumferentially spaced apart discharge ducts 132'. Discharge ducts 132' also incorporate louvers 133 at the ends thereof wherein the louvers may also be of the fixed or variable area type. Immediately aft of the lower leading edge 103' there may also be provided a plurality of perforations 130 for bleeding boundary layer air overboard through louvers 131 wherein the louvers may again be either of the fixed or variable area type.

Referring now to FIGS. 1 and 1A, there is shown the lower pressure, higher bypass mode of operation for the variable cycle gas turbine engine of this invention. This mode of operation is generally assumed during takeoff and before supersonic flight is attained, and it may also be assumed during landing descent after supersonic flight. It may be utilized throughout the subsonic mode of operation where engine noise must be maintained below prescribed limits and where it is desirable to maintain a low rate of fuel consumption. During this mode of operation, actuators 126 and 127 are retracted to move panels 106, 109, 116 and 119 toward the nacelle 11 and thereby open an auxiliary inlet between the aft edge of panel 116 and the forward edge 140 of panel 122. Airflow entering this auxiliary inlet is directed to the outer plenum 84 surrounding the fan forward section 42. Actuator 122A is operated to rotate panel 122 about hinge 123 until the cross-sectional area of the auxiliary inlet is optimized to provide an efficient secondary airflow. Actuators 94 are also simultaneously retracted to rotate the hinged ducts 90 of the variable flow bypass valve 88 to provide direct flow communication between the outer annular portion of the forward fan section 42 and the outer plenum 86 surrounding the aft fan section 44. Direct flow communication from the outer plenum 84 is also established to the outer annular portion of the aft fan section 44 through the spaces 91 intermediate the hinged ducts 90. As now becomes obvious, the airflow provided by the auxiliary inlet bypasses the forward fan section 42 through plenum 84 and enters the outer portion of the aft fan section 44 through the spaces 91 intermediate the hinged ducts 90. Airflow simultaneously enters the fan forward section 42 from the inlet defined by the forward edge 140 of panel 122 in cooperation with the inlet duct inner wall 107. The airflow is then pressurized by the forward fan section 42 and bypassed around the aft fan section 44 through the hinged ducts 90 and outer plenum 86 from whence the pressurized airflow is directed into the annular bypass duct 13 and commingled with the pressurized airflow exiting from the outer annular portion of the aft fan section 44.

While in the higher bypass mode of operation, it is preferred that the pressure ratios across the forward and aft fan sections be approximately identical reduce aerodynamic losses which might result when the pressurized airflows from the outer annular portions of the forward and aft fan sections are commingled in the bypass duct 13. It should also be appreciated that the airflow through the core annulus 73 is contained within non-variable boundaries and, therefore, remains substantially unaffected by the different modes of operation through which the engine may be switched.

The higher bypass - lower pressure ratio mode of operation herein described provides a large increase in the mass airflow through the gas turbine engine while lowering the fan pressure ratio as is common in high bypass turbofan engines. The higher mass airflow permits a lower outlet jet velocity and reduced noise level, without incurring a significant thrust loss. Thus, supersonic aircraft will now be able to ascend from and descend to airports situated adjacent densely populated areas without significantly increasing the noise levels incurred by today's high bypass turbofan engines. Also during the higher bypass mode of operation, fuel may be injected and ignited into the bypass burner 75 to provide a modest increase in thrust due to the increased temperature and velocity of the bypass flow while still maintaining an acceptable noise level.

Referring now to FIGS. 2 and 2A through 2G, there is shown the supersonic mode of operation, "series mode", for the variable cycle gas turbine engine 10 of this invention. For this mode of operation, the hinged ducts 90 of the variable flow bypass valve 88 are simultaneously rotated inwardly so that direct series flow connection is established between the outer annular portion of the forward fan sectoin 42 and the outer annular portion of the aft fan section 44. Actuators 126, 127 and 122A are also operated to move panels 106, 109, 116 and 122 into position, closing the auxiliary inlet, thus creating the cross-sectional duct areas required to provide efficient control of a multi-shock supersonic inlet. By interconnecting the forward and aft fan sections in series flow, and blocking the airflow into plenum 84, the mass airflow through the engine is decreased, and the pressure ratio is increased. Thus the bypass ratio of the engine is significantly reduced to more closely resemble that of an augmented supersonic turbofan engine, thereby facilitating supersonic flight at high altitudes where increased noise levels may be disregarded.

Figure 3:
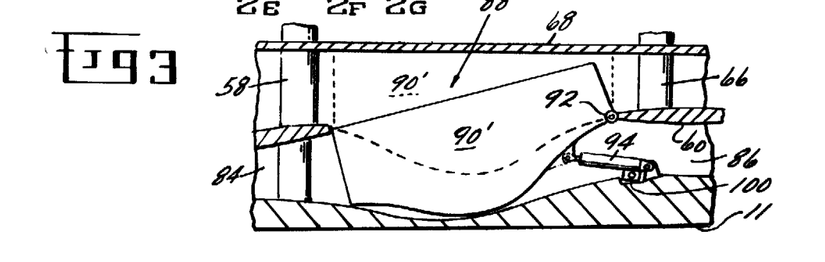
FIG. 3 is a cross-sectional view of an alternate embodiment of a portion of the variable cycle engine of FIG. 1.

Various changes could be made in the structure shown in the figures without departing from the broader aspects of the invention. For example, the engine has been described in relation to a two-stage fan 12; however, the fan may include more than two stages. Also, the ducts 90 have been shown as hinged to the forward fan section outer shroud 46 although they could alternatively be hinged at 92 to the aft fan section outer shroud 60, as shown in FIG. 3, where like numerals refer to previously described elements. The solid lines of FIG. 3 show ducts 90' as they would be positioned for the "high bypass" mode of operation of FIGS. 1 and 1A through 1G, while the phantom lines show the ducts 90' as they would be positioned for the "series" mode of operation of FIGS. 2 and 2A through 2G. For the series mode of operation, inlet airflow to the outer portion of the aft fan section 44 is received from plenum 84 through the ducts 90' while pressurized outlet airflow from the outer portion of the forward fan section 42 is directed to plenum 86 through the spaces 91 intermediate the hinged ducts 90'.

Thus having described preferred embodiments of the invention, though not exhaustive of all possible equivalents, what is desired to be secured by letters patent is claimed below.

What is claimed is:

1. A variable cycle gas turbine engine comprising:
   a fan having a forward section axially spaced apart from an aft section;
   a variable flow bypassing valve disposed intermediate the forward and aft fan sections whereby a portion of the airflow between the forward and aft fan sections may be connected either in serial flow relation or in bypassing parallel relation, and wherein the variable flow bypassing valve includes a plurality of axially extending and circumferentially spaced apart ducts each of which is hinged at one end to the forward fan section to receive a portion of the pressurized airflow exiting from the forward fan section;
   means for simultaneously rotating the ducts about their hinges;
   a variable flow geometry inlet duct in direct flow connection to the fan for furnishing an inlet airflow to the fan;
   a core engine having a compressor, combustor and turbine in serial flow relation wherein the compressor receives another portion of the compressed airflow from the forward and aft fan sections; and
   a fan turbine drivably connected to the fan.

2. The variable cycle gas turbine engine of claim 1 wherein:
   the forward fan section includes a first outer shroud and at least one row of circumferentially spaced apart rotor blades peripherally disposed about a forward fan rotor with each rotor blade having a part span platform extending beyond the full chord thereof in abutting relation with the part span platforms of adjacent blades;
   the aft fan section includes a second outer shroud; and at least one row of circumferentially spaced apart rotor blades with each rotor blade having a part span platform extending beyond the full chord thereof in abutting relation with the part span platforms for adjacent blades; and
   there is further included an axially extending part span circumferential platform intermediate the forward and aft fan sections in general coaxial alignment with the forward and aft blade platforms and in spaced apart relation to an inner engine fairing defining an inner core flow annulus in flow connection to the core engine compressor.

3. The variable cycle gas turbine engine of claim 2 wherein:
   the forward fan section includes a plurality of circumferentially spaced apart inlet guide vanes extending radially outward from an inner circumferential support ring to the first shroud and a plurality of circumferentially spaced apart outlet guide vanes extending radially outward from the inner engine fairing to the first shroud;
   the aft fan section includes a plurality of circumferentially spaced apart inlet guide vanes extending radially outward from the inner engine fairing to the second shroud and a plurality of circumferentially spaced apart outlet guide vanes extending radially outward from an inner ring frame to the second shroud;
   the axially extending part span circumferential platform interconnects the forward fan section outlet guide vanes with the aft fan section inlet guide vanes and there is further included an axially extending circumferential nacelle spaced outward of the first and second shrouds to define first and second plenums respectively wherein the nacelle is also spaced outward from the core engine to define an annular bypass duct therebetween;
   the variable flow bypassing valve includes a plurality of axially extending and circumferentially spaced apart ducts, each of which is hinged to the first shroud to receive the pressurized airflow exiting from that portion of the forward fan section intermediate the forward part span blade platforms and first shroud;
   and the means for simultaneously rotating the ducts about their hinges operate so that the outlet airflow exiting from the ducts may be directed either to that portion of the aft fan section intermediate the aft part span blade platforms and second shroud in which case the variable geometry inlet simultaneously operates to block inlet airflow to the first plenum, or
   to the second plenum, in which case the variable geometry inlet simultaneously operates to allow inlet airflow to the first plenum whereupon te airflow is then directed between the spaced apart ducts to that portion of the aft fan section intermediate the aft part span blade platforms and second shroud.

4. The variable cycle gas turbine engine of claim 3 wherein:
   the rotating means include a plurality of circumferentially spaced apart actuators, each of which interconnects between one of the spaced apart ducts and the nacelle and a flexible drive shaft extending circumferentially around to interconnect the actuators.

5. The variable cycle gas turbine engine of claim 3 wherein:
the annular bypass duct includes a fan burner stationed therein with the aft end thereof terminating in a variable area nozzle having a convergent primary nozzle and a divergent secondary nozzle;
the forward fan secton inlet guide vanes have variable trailing edge flaps;
the combustion gases from the core engine discharge through a core engine nozzle defined in part by a variable plug;
and there are further included a plurality of bypass passages communicating between the inner core and bypass duct wherein the passages include a valve mechanism for controlling the flow of air therethrough.

6. A variable cycle gas turbine engine comprising:
a fan having a forward section axially spaced apart from an aft section;
a variable flow bypassing valve disposed intermediate the forward and aft fan sections whereby a portion of the airflow between the forward and aft fan sections may be connected either in serial flow relation or in bypassing parallel relation, and wherein:
the variable flow bypassing valve includes a plurality of axially extending and circumferentially spaced apart ducts, each of which is hinged at one end to the aft fan section;
means for simultaneously rotating the ducts about their hinges;
a variable flow geometry inlet duct in direct flow connection to the fan for furnishing an inlet airflow to the fan;
a core engine having a compressor, combustor and turbine in serial flow relation wherein the compressor receives another portion of the compressed airflow from the forward and aft fan section, and
a fan turbine drivably connected to the fan.

7. The variable cycle gas turbine engine of claim 6 wherein:
the forward fan section includes a first outer shroud, and at least one row of circumferentially spaced apart rotor blades peripherally disposed about a forward fan rotor with each rotor blade having a part span platform extending beyond the full chord thereof in abutting relation with the part span platforms of adjacent blades;
the aft fan section includes a second outer shroud, and at least one row of circumferentially spaced apart rotor blades with each rotor blade having a part span platform extending beyond the full chord in abutting relation with the part span platforms of adjacent blades; and
there is further included an axially extending part span circumferential platform intermediate the forward and aft fan sections in general coaxial alignment with the forward and aft blade platforms and in spaced apart relation to an inner engine fairing defining an inner core flow annulus in flow connection to the core engine compressor.

8. The variable cycle gas turbine engine of claim 7 wherein:
the forward fan section includes a plurality of circumferentially spaced apart inlet guide vanes extending radially outward from an inner circumferential support ring to the first shroud and a plurality of circumferentially spaced apart outlet guide vanes extending radially outward from the inner engine fairing to the first shroud;
the aft fan section includes a plurality of circumferentially spaced apart inlet guide vanes extending radially outward from the inner engine fairing to the second shroud and a plurality of circumferentially spaced apart outlet guide vanes extending radially outward from an inner ring frame to the second shroud;
the axially extending part span circumferential platform interconnects the forward fan section outlet guide vanes with the aft fan section inlet guide vanes and there is further included an axially extending circumferential nacelle spaced outward of the first and second shrouds to define first and second plenums respectively wherein the nacelle is also spaced outward from the core engine to define an annular bypass duct therebetween;
the variable flow bypassing valve includes a plurality of axially extending and circumferentially spaced apart ducts, each of which is hinged to the second shroud to deliver an outlet airflow to that portion of the aft fan section intermediate the aft part span blade platforms and second shroud;
and the means for simultaneously rotating the ducts about their hinges operate so that the inlet airflow to the ducts may be received either from that portion of the forward fan section intermediate the forward part span blade platforms and first shroud, in which case the variable geometry inlet simultaneously operates to block inlet airflow to the first plenum, or from the first plenum in whcih case the variable geometry inlet simultaneously operates to allow inlet airflow to the first plenum and whereupon pressurized airflow from that portion of the forward fan section intermediate the forward part span blade platforms and first shroud is directed between the spaced apart ducts to the second plenum.

9. The variable cycle gas turbine engine of claim 8 wherein:
the rotating means include a plurality of circumferentially spaced apart actuators, each of which interconnects between one of the spaced apart ducts and the nacelle, and a flexible drive shaft extending circumferentially around to interconnect the actuators.

10. The variable cycle gas turbine engine of claim 8 wherein:
the annular bypass duct includes a fan burner stationed therein with the aft end thereof terminating in a variable area nozzle having a convergent primary nozzle and a divergent secondary nozzle;
the forward fan section inlet guide vanes have variable trailing edge flaps;
the combustion gases from the core engine discharge through a core engine nozzle defined in part by a variable plug;
and there are further included a plurality of bypass passages communicating between the inner core and bypass duct wherein the passages include a valve mechanism for controlling the flow of air therethrough.

11. A variable cycle gas turbine engine comprising:
a fan having a forward section axially spaced apart from an aft section wherein:
the forward fan section includes a first outer shroud, and at least one row of circumferentially spaced apart rotor blades peripherally disposed about a forward fan rotor with each rotor blade having a part span platform extending beyond the full chord thereof in abutting relation with the part span platforms of adjacent blades;
and the aft fan section includes a second outer shroud, and at least one row of circumferentially spaced apart rotor blades with each rotor blade having a part span platform extending beyond the full chord thereof in abutting relation with the part span platforms of adjacent blades;
a variable flow bypassing valve disposed intermediate the forward and aft fan sections whereby the airflow between the forward and aft fan sections may be connected either in serial flow relation or in bypassing parallel relation;
a variable flow geometry inlet duct in direct flow connection to the fan for furnishing an inlet airflow to the fan wherein the variable geometry inlet duct includes:
a nacelle extending forwardly of the engine and terminating in a leading edge to provide an inlet opening;
a plurality of movable panels interconnected by a plurality of hinges and stationed within the nacelle for movement relative to the nacelle;
an inlet wall in fixed spaced apart relation relative to the nacelle defining a first passageway in flow communication with the bypassing valve and a second passageway in flow communication with the forward fan section and further including a first movable panel hinged to the forward edge of the wall whereby the inlet to the first passageway may be closed by movement of the movable panels into engagement with the first movable panel;
a core engine having a compressor, combustor and turbine in serial flow relation wherein the compressor receives a portion of the compressed airflow from the fan, and
a fan turbine drivably connected to the fan.

12. The variable cycle gas turbine engine of claim 11 wherein:
a fixed ramp extends rearward from the nacelle leading edge to define a portion of the inside surface of the variable geometry inlet duct;
the plurality of movable panels includes: a second movable panel hinged to the aft edge of the ramp for angular movement relative to the ramp while remaining in sealed relation to the inside of the inlet duct, a first perforated movable panel hinged to the aft edge of the second movable panel, a second perforated movable panel hinged to the aft edge of the first perforated movable panel, a third movable panel hinged to the aft edge of the second perforated panel with the upper edge thereof translatably engaged to the inside surface of the nacelle by a fixed track section, and a flexible seal fixedly connected to the aft edge of the second perforated movable panel for engagement with the first movable panel and a plurality of actuators connecting between the movable panels and nacelle for moving the movable panels.

13. The variable cycle gas turbine engine of claim 12 including:
a two piece collapsible seal having one piece hinged to the inside surface of the nacelle and the other piece hinged to the aft edge of the first perforated movable panel with a center hinge interconnecting the two seal pieces wherein the collapsible seal extends the full transverse width of the inlet duct with the opposing sides thereof in sealing engagement to the inside surface of the nacelle;
a first plenum defined by the cooperative arrangement of the nacelle, ramp, second movable panel, first perforated movable panel and collapsible seal for receipt of the boundary layer air bled through the perforations of the first perforated movable panel wherein the first plenum also communicates with a plurality of louvers through the nacelle for discharging the bleed air from the plenum;
a second plenum defined by the cooperative arrangement of the nacelle, collapsible seal, second perforated movable panel, and third movable panel for receipt of the boundary layer air bled through the perforations of the second perforated movable panel wherein the second plenum communicates with a second plurality of louvers through the nacelle for discharging the bleed air from the second plenum;
an annular duct around the inlet wall in communication with a plurality of perforations extending circumferentially around a portion of the axial length of the inlet wall for receipt of the boundary layer air bled therethrough, and
a plurality of circumferentially spaced apart ducts having louvers disposed therein and communicating with the annular duct for the discharge of bleed air collected therein.

14. The variable cycle gas turbine engine of claim 13 wherein the means for simultaneously rotating the ducts include a plurality of circumferentially spaced apart actuators, each of which interconnects between one of the spaced apart ducts and the engine and a flexible drive shaft extending circumferentially around to interconnect the actuators.

15. The variable cycle gas turbine engine of claim 13 wherein the ducts maintain a near constant cross-sectional area and assume a near teardrop cross-sectional configuration through a portion of their axial length in order to diffuse the flow passing in the spaces therebetween.

16. A variable cycle gas turbine engine comprising:
a fan having a forward section axially spaced apart from an aft section;
variable flow bypassing valve means disposed intermediate the forward and aft fan sections for causing a portion of the airflow between the forward and aft fan sections to be connected either in serial flow realtion or in bypassing parallel relation, and wherein the variable flow bypassing valve means includes a plurality of axially extending and circumferentially spaced apart ducts, each of which is hinged at the same end of the fan;
a core engine having a compressor, combustor and turbine in serial flow relation the compressor receives a portion of the compressed airflow from the fan, a fan turbine drivably connected to the fan, and means for simultaneously rotating the ducts about their hinges to a first position wherein a portion of the airflow between the forward and aft fan sections is connected in serial flow relation whereby another portion of the air flowing from both the front and aft fan sections enters the compressor and to a second position wherein a portion of the airflow between the forward and aft fan sections are connected in bypassing parallel relation whereby the air flowing through the front fan section bypasses the aft fan section.

17. The variable cycle gas turbine engine of claim 16 further including a variable geometry inlet duct in direct flow connection to the fan for furnishing an inlet airflow to the fan.

18. The variable cycle gas turbine engine of claim 17 wherein the variable flow geometry inlet duct includes means for dividing incoming airflow into inner and outer concentric flow paths.

19. The variable cycle gas turbine engine of claim 18 wherein said variable geometry inlet duct comprises:
- a nacelle extending forwardly of the engine and terminating in a leading edge to provide an inlet opening;
- a plurality of movable panels interconnected by a plurality of hinges ans stationed within the nacelle for movement relative to the nacelle;
- an inlet wall in fixed spaced apart relation relative to the nacelle defining a first passageway in flow communication with the outer concentric flowpath and a second passageway in flow communication with the inner concentric flowpath and further including a first movable panel hinged to the forward edge of the wall whereby the inlet to the first passageway may be closed by movement of the movable panels into engagement with the first movable panel.

20. The variable cycle gas turbine engine of claim 19 wherein:
- a fixed ramp extends rearward from the nacelle leading edge to define a portion of the inside surface of the variable geometry inlet;
- the plurality of movable panels includes: a second movable panel hinged to the aft edge of the ramp for angular movement relative to the ramp while remaining in sealed relation to the inside of the inlet duct, a first perforated movable panel hinged to the aft edge of the second movable panel, a second perforated panel hinged to the aft edge of the first perforated movable panel, a third movable panel hinged to the edge of the second perforated panel with the upper edge thereof translatably engaged to the inside surface of the nacelle by a fixed track section, and a flexible seal fixedly connected to the aft edge of the second perforated movable panel for engagement with the first movable panel and a plurality of actuators connecting between the movable panels and nacelle for moving the movable panels.

21. The variable cycle gas turbine engine of claim 19 including:
- a two piece collapsible seal having one piece hinged to the inside surface of the nacelle and the other piece hinged to the aft edge of the first perforated movable panel with a center hinge interconnecting the two seal pieces wherein the collapsible seal extends the full transverse width of the inlet duct with the opposing sides thereof in sealing engagement to the inside surface of the nacelle;
- a first plenum defined by the cooperative arrangement of the nacelle, ramp, second movable panel, first perforated movable panel and collapsible seal for receipt of the boundary layer flow bled through the perforations of the first perforated movable panel wherein the first plenum also communicates with a plurality of louvers through the nacelle for discharging the bleed flow from the plenum;
- a second plenum defined by the cooperative arrangement of the nacelle, collapsible seal, second perforated movable panel, and third movable panel for receipt of the boudary layer flow bled through the perforations of the second perforated movable panel wherein the second plenum communicates with a second plurality of louvers through the nacelle for discharging the bleed flow from the second plenum;
- an annular duct around the inlet wall in communication with a plurality of perforations extending circumferentially around a portion of the axial length of the inlet wall for receipt of the boudary layer flow bled therethrough, and
- a plurality of circumferentially spaced apart ducts having louvers disposed therein and communicating with the annular duct for discharge of bleed flow collected therein.

* * * * *